United States Patent [19]

Steiner et al.

[11] 4,173,846
[45] Nov. 13, 1979

[54] ORBITAL SAW SHARPENING DEVICE

[75] Inventors: Gary F. Steiner; James F. Campbell, both of Green Bay, Wis.

[73] Assignee: Paper Converting Machine Company, Green Bay, Wis.

[21] Appl. No.: 871,235

[22] Filed: Jan. 23, 1978

[51] Int. Cl.² ............................................. B24B 3/46
[52] U.S. Cl. ...................................... 51/248; 83/174
[58] Field of Search ................ 51/248, 247, 249, 246; 83/174, 174.1

[56] References Cited

U.S. PATENT DOCUMENTS 2,766,566  10/1956  Gage ...................................... 51/248
3,213,731  10/1965  Renard ................................... 83/174
3,820,289   6/1974  Good ..................................... 51/248
4,041,813   8/1977  Spencer ................................. 83/174

Primary Examiner—Robert Louis Spruill
Assistant Examiner—Roscoe V. Parker
Attorney, Agent, or Firm—Tilton, Fallon, Lungmus & Chestnut

[57] ABSTRACT

A sharpening device for an orbital saw involving a pair of circular grinding stones freely journalled in a subassembly which in turn is slidably and pivotally mounted on the frame of the saw while being pivotally supported on the member providing the orbital motion for the saw.

5 Claims, 19 Drawing Figures

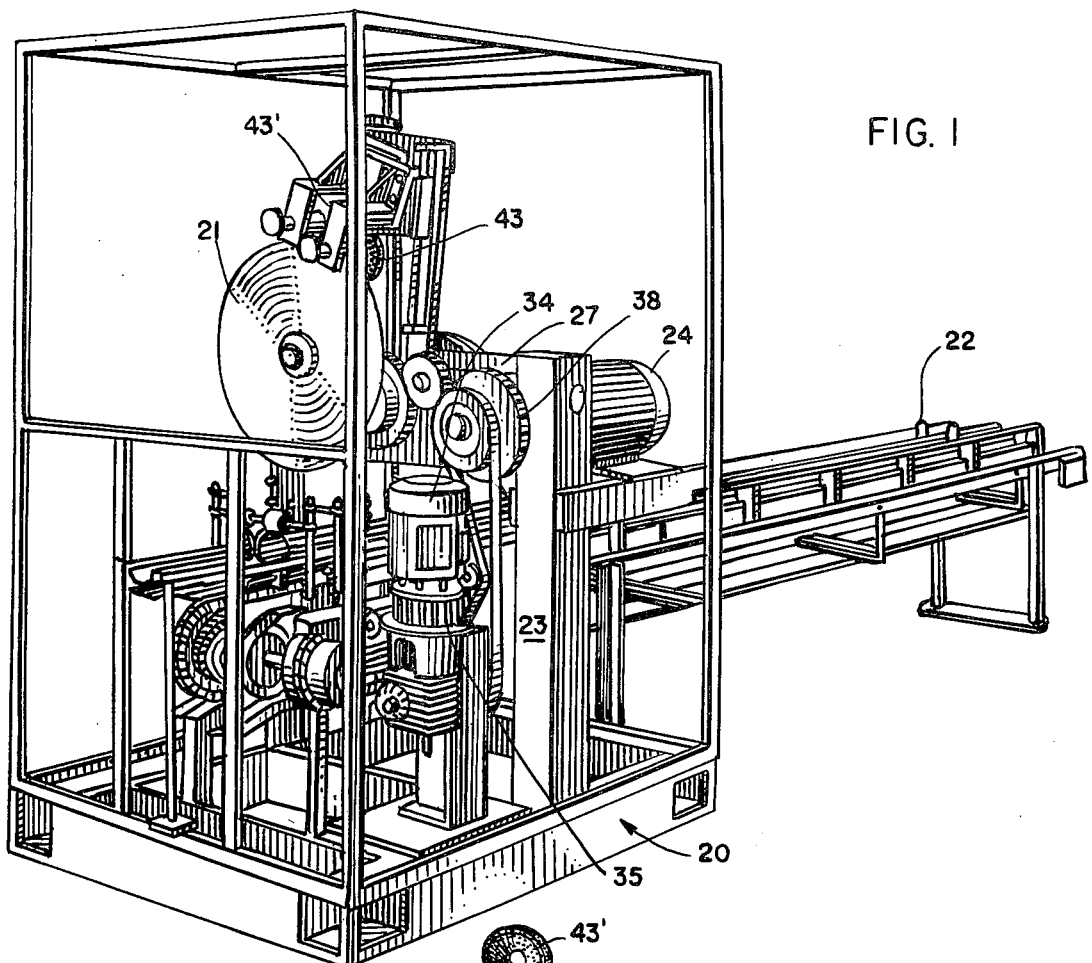
FIG. 1
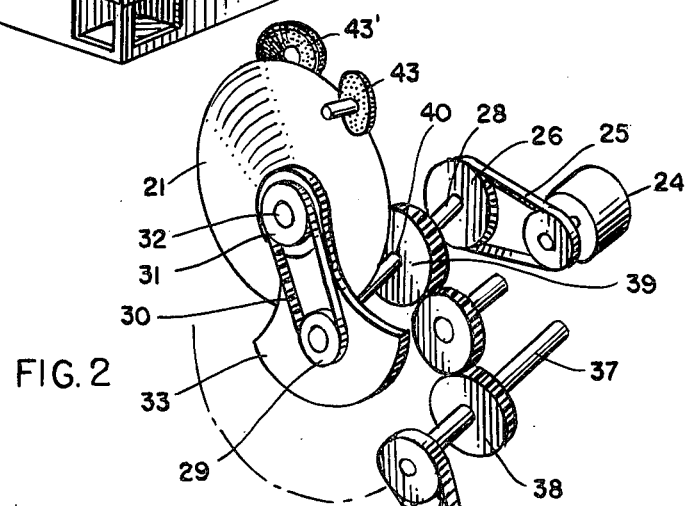
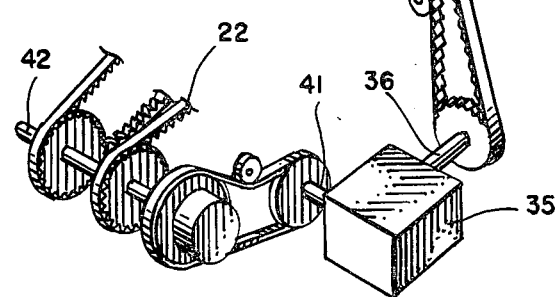
FIG. 2

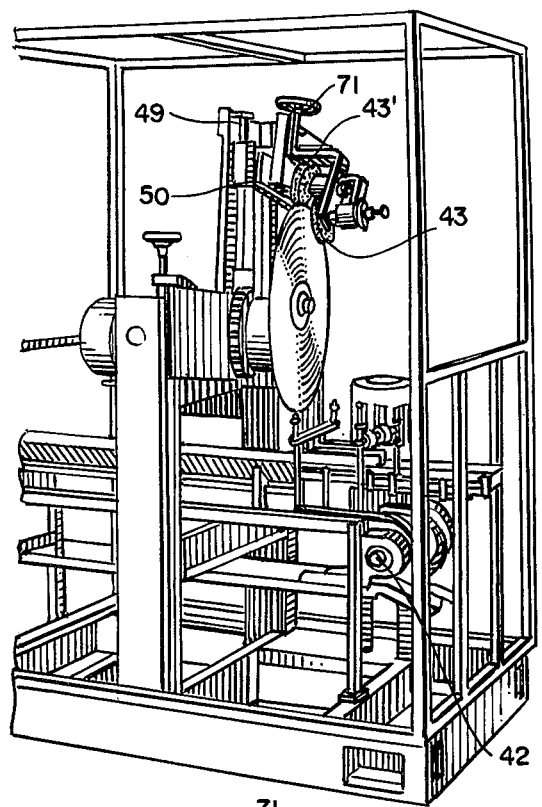
FIG. 3
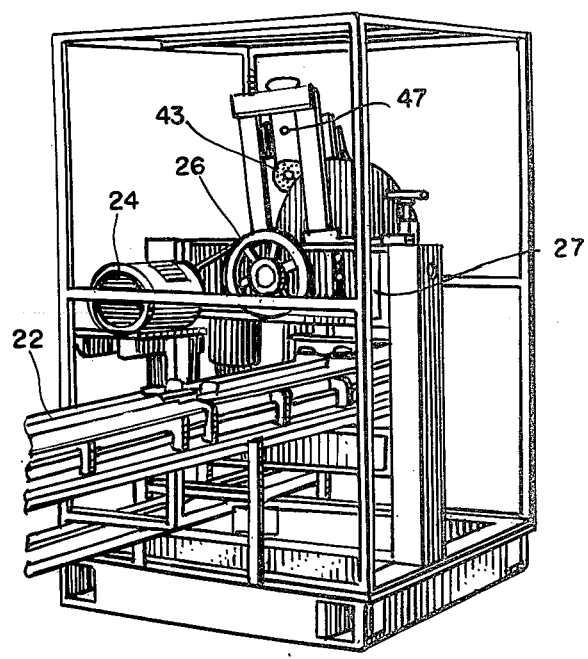
FIG. 5
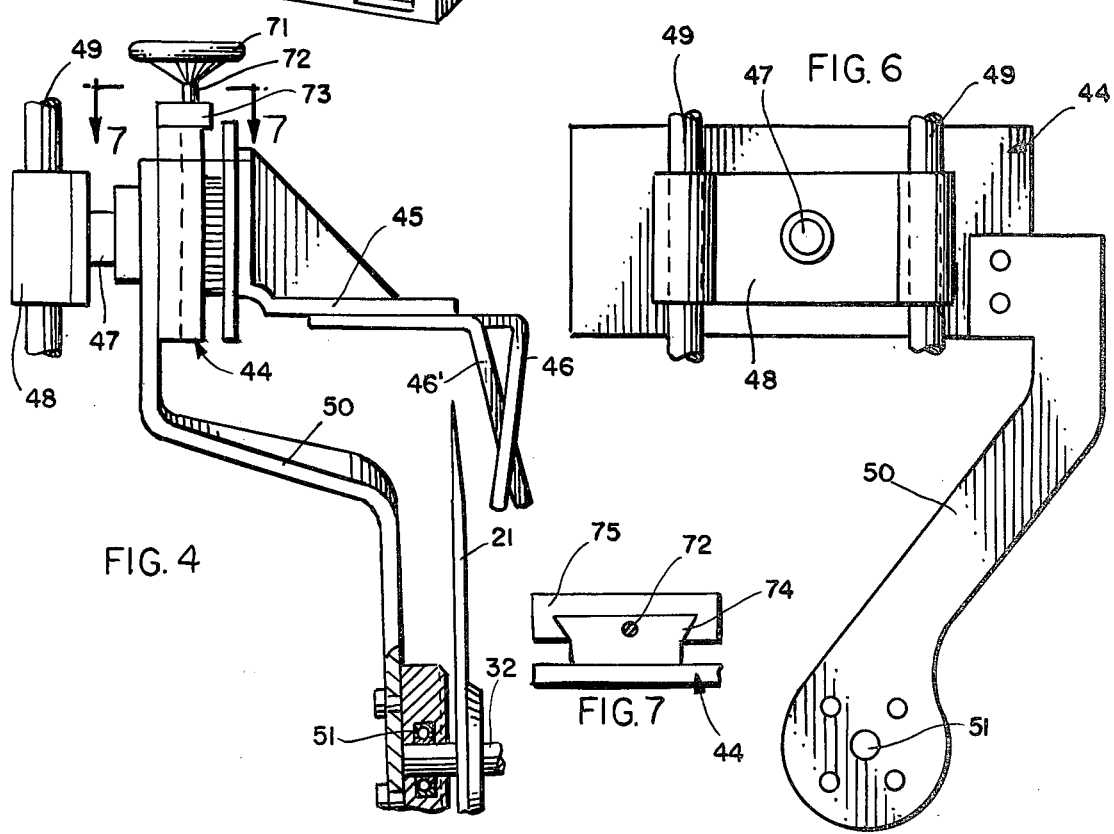
FIG. 4
FIG. 6
FIG. 7

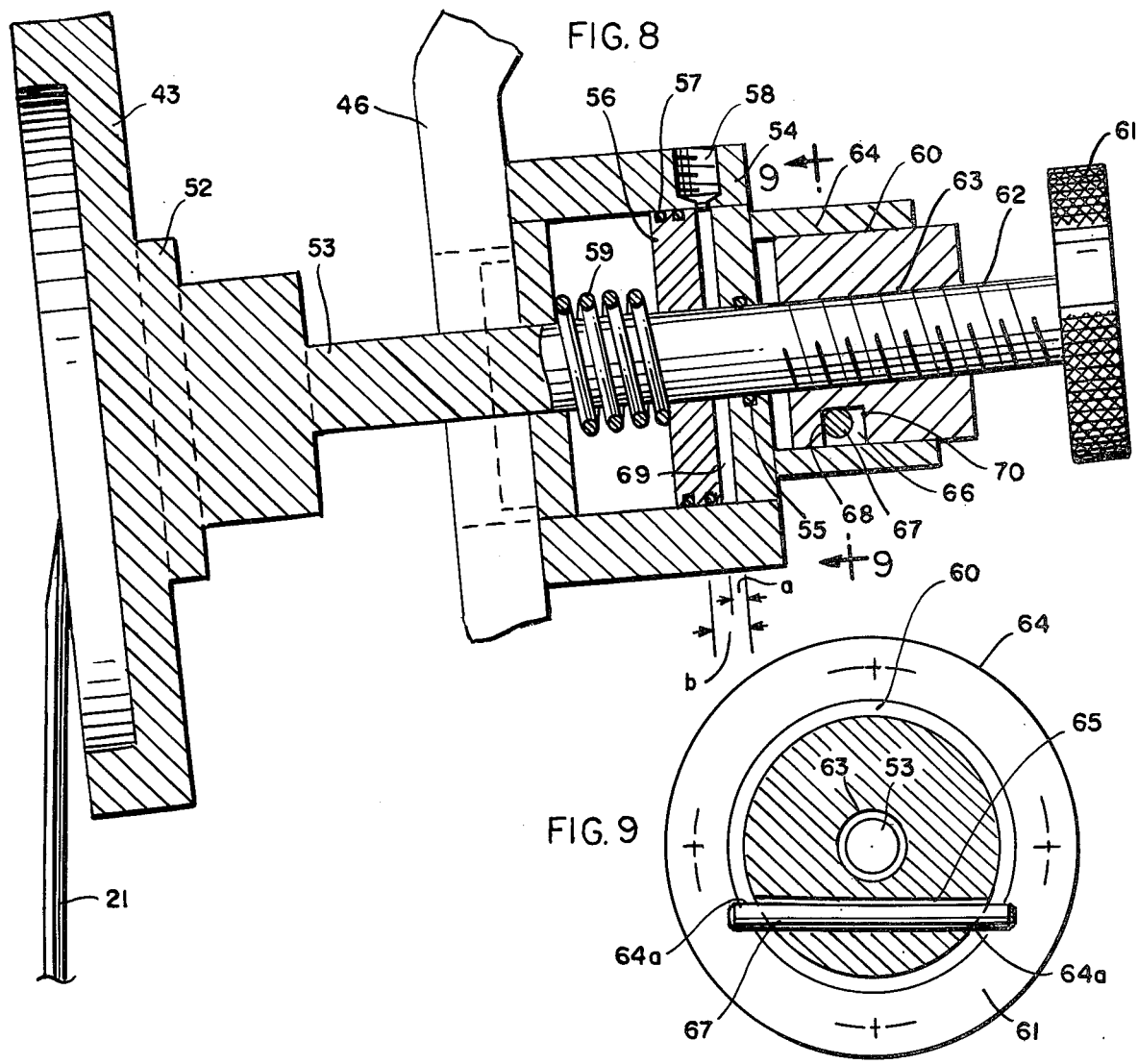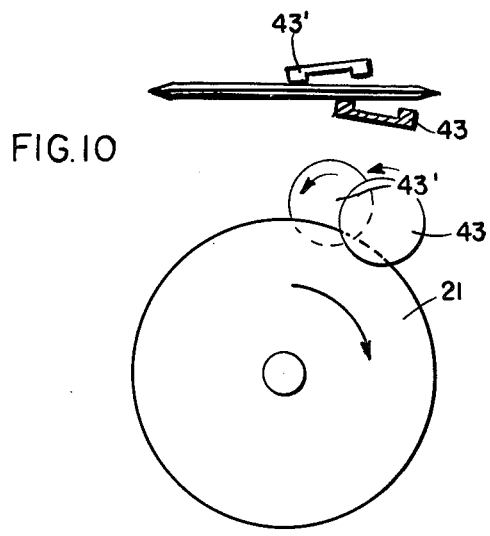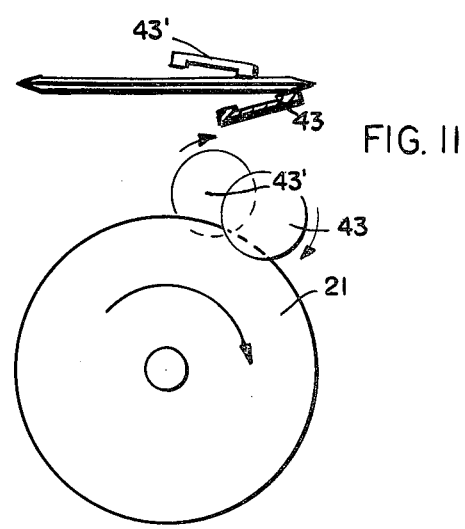

ORBITAL SAW SHARPENING DEVICE

BACKGROUND AND SUMMARY OF INVENTION

Starting in the 1950's the paper converting art turned to log saws such as the oscillating disc saw of U.S. Pat. No. 2,752,999 colloquially known as the "Gilbertville" saw. Prior to that time, when manufacturing toilet paper and household toweling rolls, the webs were longitudinally slit during rewinding—as seen for example in U.S. Pat. No. 2,769,600. Rewinding consisted of unreeling a wide web (usually 63" wide or more—in multiples of the 4½" width of toilet paper roll squares) from the parent or jumbo roll 5' or more in diameter. Prior to rewinding into retail-sized rolls, the web was transversely perforated and longitudinally slit on 4½" centers (11" for towels). Because the web sometimes had defects such as "fish-eyes", viz., large holes in the web, wrinkles and caliper variations, it was possible for one or more of the 4½" wide strips to suddenly become discontinuous. In a 63" wide rewinder (a polular size in the 1950's—corresponding to 14-4½" widths), this would mean then one slit web would suddenly stop advancing while the other 13 proceeded normally. Nonetheless, the rewinding operation had to be quickly stopped—with the web being advanced at 1,000 feet per minute, even the one discontinuous width could quickly jam the machine. This meant that the other webs would be stopped and the partially completed rolls jettisoned—resulting in considerable waste.

Another main problem on the machines with slitters was the difficulty in transferring 14 separate webs to the new core at continuous speeds of 1,000 feet per minute. Log sawing after the rewinder allowed the rewinder to transfer a single full width web, i.e., 63"—much easier and consistently.

Waste also occurred because the slitting could not be started until the web was fully threaded through the machine and on the ultimate cardboard cores. This meant that every start-up wasted both the unslit paper used to thread the machine and the cores on which this was wound. All of these problems were avoided by the Gilbertville log saw which operated on the "rewound" retail-sized log. For example, the nominal 63" wide web (the web was usually 66" wide to insure an inch or so trim along each edge) would be wound on an elongated cardboard core of the same length. The log was then removed from the rewinder to the log saw where it was indexed or stepped 4½" at a time past the oscillating disc.

Because the disc was sawing through a log that approximated a wooden log 4–6" in diameter, it quickly became dull so that it was necessary to frequently renew the periphery. This was done by mounting abrasive wheels adjacent the periphery of the disc and selectively bringing the disc and wheels into contact—as seen in U.S. Pat. No. 2,766,566.

One of the drawbacks of the Gilbertville saw was the fact that its oscillating movement had to stop twice each cycle to reverse its movement. This limited production as well as requiring heavier parts to withstand the deceleration. The next improvement which overcame this difficulty was the orbital saw of U.S. Pat. No. 3,213,731.

In that patent, the disc followed an orbit wherein the logs were indexed along a path that was adjacent the nadir of the orbit. However, the disc movement still had to be stopped—now, however, to accommodate sharpening, but not during each cycle. The extent of the sharpening can be appreciated from the fact that the disc diameter when first installed was usually 21" but at the end of its working life was down to 18". The stopping of the orbital saw for sharpening was tolerable because this was coordinated with log indexing.

When production demands became greater, the indexing was discontinued and the disc moved through an orbit skewed relative to the log path—as shown in U.S. Pat. No. 4,041,813. To eliminate the need for any stoppage of the orbiting saw, the sharpening stones were moved with the saw, as with the Gilbertville saw. However, to move the sharpening stones with an orbital saw required a complicated mechanism to maintain the stones in a predetermined attitude relative to the saw (always above the saw)—a problem not present in the oscillating Gilbertville saw. According to the present invention, a novel linkage or interconnection is provided between the subframe supporting the stones and both the frame of the machine as well as the member which supports the saw eccentrically to provide the orbital motion. More particularly, this is achieved through the use of a pivotal and slidable connection between the machine frame and a pivotal connection between the saw mounting member. Further, in one preferred embodiment of the invention, the stones are freely journalled within the subframe and are equipped with adjustable limits so that uniform and controllable forces are applicable to opposite sides of the saw.

Other objects and advantages of the invention may be seen in the details of the ensuing specification.

DETAILED DESCRIPTION

The invention is described in conjunction with the accompanying drawing, in which FIG. 1 is a perspective view of a saw apparatus incorporating teachings of this invention;

FIG. 2 is a perspective somewhat schematic view of the power trains employed in the apparatus of FIG. 1;

FIG. 3 is another perspective view of the saw apparatus of FIG. 1;

FIG. 4 is a fragmentary elevational view of the portion of the apparatus seen in FIG. 3;

FIG. 5 is another perspective view of the apparatus of FIG. 1 but here viewed from the "upstream" side;

FIG. 6 is an enlarged fragmentary elevational view as would be viewed essentially from the same direction as FIG. 5;

FIG. 7 is a fragmentary sectional view taken along the sight line 7—7 of FIG. 4;

FIG. 8 is an enlarged sectional view taken along one of the grinding stone supporting assemblies;

FIG. 9 is an elevational view taken along the line 9—9 of FIG. 8;

FIG. 10 is a schematic elevational view showing the arrangement of stones relative to the disc blade for superior performance; and FIG. 11 is a view similar to FIG. 10 but showing the stone arrangement which is the opposite of that seen in FIG. 10 and thus not preferred.

Figure 12:
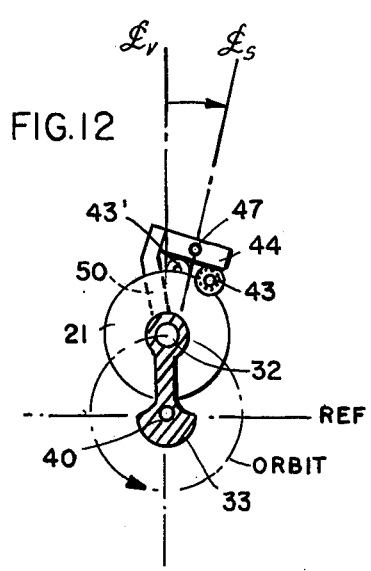
FIGS. 12–19 are schematic views showing the positions of the grinding stones during various portions of the orbit.

In the illustration given and with reference first to FIG. 1, the numeral 20 designates generally a frame for the orbital saw which features a circular disc 21 in the upper central portion thereof. The disc 21 is orbited while rotating at high speed to pass through paper logs (not shown) which are advanced along a conveyor 22. The arrangement of the various driving mechanisms is quite compact and thus conserving of space while providing ready access for repair, replacement or adjustment should such become necessary.

For example, the frame 20 includes a pedestal 23 which serves as an advantageous mounting for parts of the various driving mechanisms. These are shown in schematic, perspective form in FIG. 2.

Referring now to FIG. 2, the numeral 24 designates a motor for rotating the disc 21, the motor 24 being supported suitably on the frame 20 as can be appreciated from a consideration of FIG. 1.

The motor 24 is seen to be on the "upstream" side of the pedestal 23 and is connected by means of a belt-drive 25 to a pulley 26 (see also FIG. 5) which in turn is rotatably supported on a cross beam 27 (see FIG. 5). The shaft 28 which carries the pulley 26 extends through the cross beam 27 and is equipped with a driving pulley 29 (shown only in FIG. 2). The driving pulley 29 transmits rotational power through a belt 30 to a pulley 31 mounted on the shaft 32 which carries the disc 21. The shaft 32 is journalled within a crank member 33 so as to position the shaft 32 eccentrically relative to the shaft 28. Thus, as the crank member 33 rotates, the shaft 32 and hence the disc 21 both orbit around the axis of the shaft 28. For the purpose of revolving the crank member 33, a separate power train is provided which will now be described.

First referring to FIG. 1, a second motor 34 is provided on the frame 20 but downstream of the pedestal 23. Rotational power from the motor 34 is delivered to a cam box 35 which is featured schematically in FIG. 2.

A first output from the cam box 35 is a shaft 36 which is belt-connected to a shaft 37 carrying a gear 38 for driving the crank arm 33. The gear 38 is interconnected with a driven gear 39 which is fixed to a shaft 40 concentric to the shaft 28 and on which the crank arm 33 is also mounted.

A second output shaft 41 is provided on a cam box 35 which is belt-connected to the driving shaft 42 of the conveyor 22. Through the driving trains just described, an exceptionally advantageous arrangement of parts is provided which facilitates maintenance for the entire conveying and sawing system.

SHARPENING DEVICE

To maintain the disc 21 in a sharp condition, a pair of sharpening stones 43 and 43' are provided. A correctly sharpened disc 21 has equal bevels on both sides of the disc extending around the circumference and when a log is cut the side of a cut roll will be found smooth without minimal ridges or imperfections. To achieve this, it is necessary that sharpening be provided from time-to-time by engaging the stones 43 and 43' with the disc 21. However, the sharpening should be minimum to produce a satisfactory cut and avoid shortening the blade life. Advantageously, the length of a grind is of the order of one or two seconds and in the illustration given about once every 45 orbits.

For this purpose, the stones 43 and 43' are rotatably supported on a subframe generally designated 44 (see FIG. 4). The subframe 44 is equipped with an angle support 45 (still referring to FIG. 4) which in turn carries a pair of brackets 46 and 46'—one for each of the stones 43 and 43', respectively. The details of the apparatus actually supporting the stone 43 are seen in FIG. 8 and will be referred to hereinafter.

Referring again to FIG. 4, it will be seen that the subframe 44 is equipped with a mounting shaft 47 which projects rearwardly, i.e., upstream relative to the direction of log movement. The shaft 47 in turn is carried by means of a cross plate 48 (see particularly FIG. 6) which is slidably mounted on rods 49 provided as part of the frame 20. Thus, the subframe 44 is enabled to reciprocate generally vertically as illustrated while also pivoting relative to the frame, thereby enabling the stones 43 and 43' to remain in a predetermined attitude above the saw disc 21 as the latter moves throughout its orbit.

For the purpose of inducing the subframe 44 to follow the orbit of the disc 21, a connecting arm 50 (see particularly FIGS. 3 and 4) is provided which is fixed at one end to the subframe 44 and at its lower end is journalled as at 50a for free rotation about the axis 32 (see FIG. 4) of the disc 21.

The combination of the slidable pivotal mounting of the sub-assembly 44 relative to the frame and its pivotal relationship relative to the orbiting axis of the disc 21 develops a compound type of motion which approximates a figure 8 but which insures that the stones remain in contact with the periphery or edge of the disc 21 throughout its orbit, when desired.

As indicated previously, the sharpening should be only that necessary to maintain the sharp edge on the disc and for this purpose a mechanism is provided for selectively bringing the stones 43 and 43' into contact with the disc 21.

Reference is now made to FIG. 8 wherein it is seen that the stone 43 is equipped with a central mount 52. The mount 52 includes an internal bearing (not shown) which permits the stone 43 to rotate freely on the supporting shaft 53. The supporting shaft 53 is journalled within an air cylinder 54 which is bolted to the bracket 46. A suitable seal 55 is provided in one end wall of the cylinder 54, the shaft 53 serving essentially as a piston rod and being equipped in the portion within the air cylinder 54 with integral piston 56 also equipped with suitable seals as at 57. Thus, as pressure fluid such as air is introduced into the port 58, the piston 56 is moved to the left (as illustrated in FIG. 8) and against the coiled spring 59 to move the stone 43 into engagement with the disc 21.

To carefully and reliably control the pressure of the engagement of the stones 43 and 43' with the disc 21, an adjustable limit generally designated 60 is provided on the extension of the shaft 53. The shaft 53 is equipped at the end thereof opposite that carrying the stone 43 with a knurled knob 61 and a portion of the shaft 53 is equipped with threads as at 62. The threads 62 mate with corresponding threads 63 within the adjustable limit 60. The adjustable limit 60 is mounted within a hollow projection 64 provided as part of the cylinder 54 and is thus also fixed relative to the frame. The adjustable limit 60 is seen to be generally cylindrical in nature (see FIG. 9) but with a portion removed to provide a flat surface 65. Holes 64a drilled through the sidewall of projection 64 allow insertion of pin 67, the pin preventing rotation of the adjustable limit 60 by virtue of engagement between the upper surface of fixed pin 67 and upper surface 65 of cutout 66.

The adjustable limit 60 is equipped with a cutout notch 66 (see the right hand portion of FIG. 8) and extending through this recess an expansion pin 67 is fixed within the housing 64. In the condition of the apparatus illustrated in FIG. 8 no pressure exists within the cylinder 54 so that the coiled spring 59 urges the piston 56 and thus the shaft 53 to the right bringing the recess wall 68 into engagement with the pin 67 and thereby limiting the amount of piston movement. This prevents the piston from "bottoming" in the cylinder and insures that ample space is provided within the cylinder as at 69 for the introduction of pressure fluid to move the piston 56 to the left incident to engaging the stone 43 with the disc 21. When pressure fluid is so introduced, the piston 56 is moved to the left and with it the shaft 53 which is integral therewith. This also results in the adjustable limit 60 being moved to the left but only the distance between the recess wall 70 and the pin 67. To achieve a sharp disc 21 while conserving the life, it is advantageous to develop what might be considered a light or "kissing" contact between the stones 43 and 43' and the disc 21 which is achieved through the provision of the adjustable limit 60 in combination with the pin 67. In the illustration given, the stroke (b) of shaft 53 (i.e., the piston rod) is about ¼" (6.3 mm), the stroke being greater than the approximate ⅛" spacing (a) between the recess wall 70 and the pin 67. The adjustable positioning of limit 60 restricts the amount of engagement of sharpening stones 43 and 43' with disc 21, the limiting engagement being desirable to limit the magnitude of opposing forces applied against disc 21 by stones 43 and 43' and also making possible the limited engagement which results in "light" grinding which is advantageous for optimum sharpness.

When it is necessary to reposition the stones relative to the disc, as during replacement, wear, etc., it is only necessary to turn the knob 61 which will then move the stone 43 toward or away from the adjustable limit 60, while still maintaining the same stroke.

Another adjustment is provided in the form of the hand wheel 71 (see particularly FIGS. 3 and 4). The hand wheel 71 is provided as part of a rod 72 which is carried by a collar part 73 on a fixed part of the frame. The lower end of the shaft 72 is threaded and is received in a threaded portion of the sub-assembly 44. The sub-assembly 44 (see FIG. 7) is equipped with a dovetail as at 74 fitting within a corresponding slot within the portion 75 of the fixed frame 20. Thus, as the hand wheel 71 is turned, the sub-assembly 44 is moved upwardly or downwardly to accept a new disc or compensate for disc wear.

It has been found advantageous to mount the stones at an angle of 7° and also to mount the stones so that under the rotation thereof induced by the disc 21 that they rotate in a direction opposite to that of the disc. This is depicted in connection with FIGS. 10 and 11. The preferred arrangement is depicted schematically in FIG. 10 and it will be seen that for a disc 21 rotating clockwise the stones 43 and 43' rotate counterclockwise. However, if the positions of the stones 43 and 43' are reversed as shown in FIG. 11, the stones rotate in the same direction.

In addition to mounting the stones 43 and 43' so that they rotate in a direction opposite to that of the disc 21 and further to providing an adjustable limit so that the air cylinder is not free to exert its full force on the blade to cause excessive wear, optimal results are provided when the stones are constructed of resin bonded cubic boron nitride. Suitable stones of this material can be obtained from the Norton Corporation of Worcester, Massachusetts. With grinding stones of this character and mounted as idlers, in the assembly described, excellent blade performance and wear life is achieved.

Figure 13:
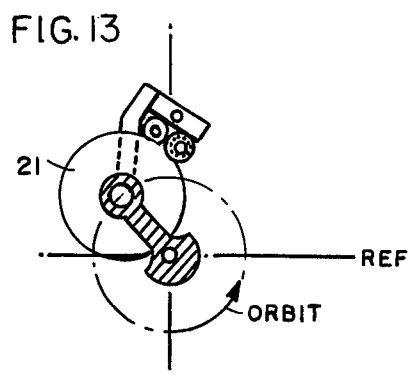
Figure 14:
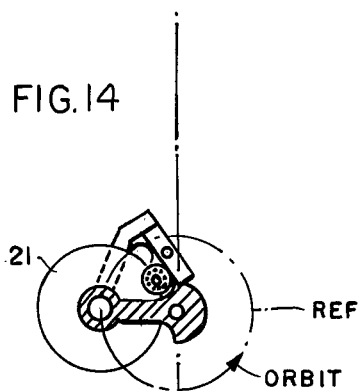
Figure 15:
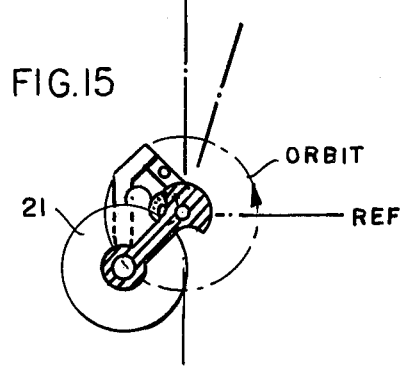

The movement of the stones 43, 43' during the course of one orbit of the saw 21 can be appreciated from a consideration of FIGS. 12-19. In FIG. 12, the disc 21 is at the zenith of the orbit as can be appreciated from a consideration of the lines marked "REF" indicating the horizontal center line through the shaft 40 and the vertical center line which is seen to pass through the saw shaft 51 as well as the shaft 40. As the crank member 33 rotates counterclockwise, the disc 21 moves accordingly and with it the sharpening stones. FIG. 13, for example, shows the configuration of elements when the crank member 33 has rotated 45° counterclockwise. As rotation continues to the point where the crank arm 33 has rotated 90° counterclockwise, the stones 43, 43' have shifted somewhat (see FIG. 14) relative to the saw disc 21. FIG. 15 shows the configuration of elements when the crank arm 33 (and hence the saw disc 21) have rotated 135° counterclockwise from the initial position illustrated in FIG. 12.

Figure 16:
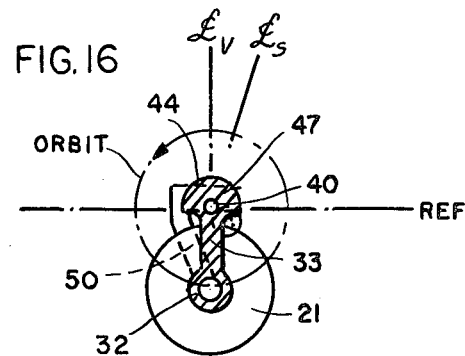
Figure 17:
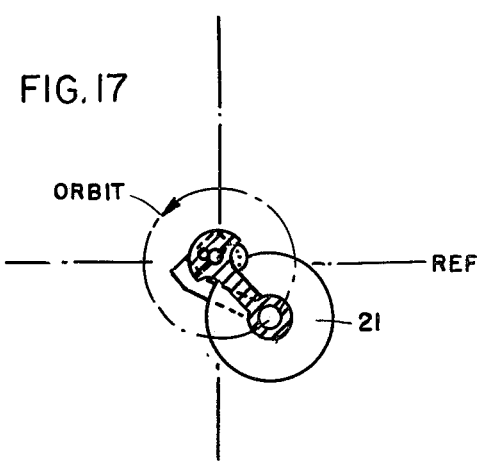
Figure 18:
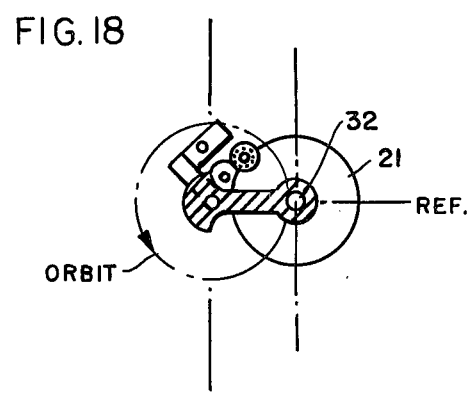
Figure 19:
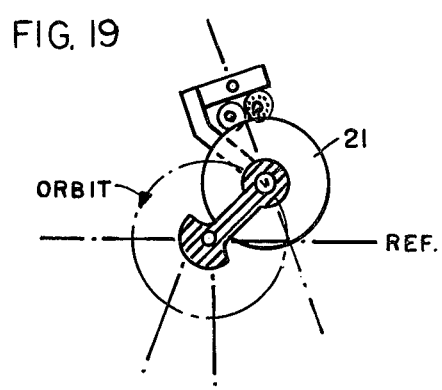

In FIG. 16, the saw disc 21 is at the nadir of its orbit and here it is seen that the stones 43, 43' are approximately directly above the saw shaft 32. In the remaining views, FIGS. 17-19, the orientation of the stones 43, 43' is illustrated curing the remainder of the orbit and it is to be noted that the stones are positioned on the opposite side of a vertical line through the shaft 51 from the position they occupy in FIGS. 12-15. Because the stones are moving vertically as well as shifting horizontally throughout an orbit, the path traced is approximately a figure 8—but the stones at all times are above the disc shaft 51. This provides a predetermined attitude of the stones relative to the disc wherein there is no possibility of interference with the sawing of wound logs moved by the conveyor 22 through the bottom of the orbit followed by the saw disc 21.

We claim:

1. In an orbital saw, a frame, a disc supporting member rotatably mounted on said frame, a disc saw eccentrically mounted on said member for movement through a vertical orbit upon rotation of said member, means on said frame for rotating said disc saw independently of the rotation of said member, a conveyor mounted on said frame for advancing logs through said orbit, and a subframe equipped with a sharpening device for the edge of said saw, said subframe being journalled on said member and pivotally, slidably mounted on said frame for contacting said edge throughout the orbit thereof while maintaining a predetermined attitude relative to said saw.

2. The structure of claim 1 in which said sharpening device includes a pair of circular grinding stones freely journalled in said, subframe said stones being disposed on opposite sides of said saw, said stones being so oriented on said subframe so as to rotate in a direction opposite to the direction of rotation of said saw.

3. The structure of claim 2 in which said stones are constructed of resin-bonded cubic boron nitride.

4. The structure of claim 2 in which means are operably associated with each stone for bringing the same into engagement with said edge, said engagement means being equipped with an adjustable limit whereby uniform and controllable forces are applicable to opposite sides of said saw.

5. The structure of claim 1 in which said frame includes a vertical pedestal, two motors on said frame, one each on opposite sides of said pedestal, a first of said motors being connected to said disc for rotating the same, the second of said motors being connected to said member and said conveyor.

* * * * *